US011637751B2

(12) United States Patent
Ryan et al.

(10) Patent No.: US 11,637,751 B2
(45) Date of Patent: Apr. 25, 2023

(54) SYSTEM AND METHOD FOR MANAGING VIRTUAL LOCAL AREA NETWORKS

(71) Applicant: Level 3 Communications, LLC, Broomfield, CO (US)

(72) Inventors: James Ryan, Littleton, CO (US); Marcus Hadavi, Denver, CO (US); Michael Renner, Englewood, CO (US); Peter Faber, Verona, WI (US); Raoul Alcala, Superior, CO (US); John Kane, Longmont, CO (US); Hans Zeschin, Denver, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 607 days.

(21) Appl. No.: 16/430,358

(22) Filed: Jun. 3, 2019

(65) Prior Publication Data

US 2019/0288912 A1 Sep. 19, 2019

Related U.S. Application Data

(63) Continuation of application No. 11/849,010, filed on Aug. 31, 2007, now Pat. No. 10,313,191.

(51) Int. Cl.
*H04L 12/24* (2006.01)
*H04L 12/46* (2006.01)
(Continued)

(52) U.S. Cl.
CPC ...... *H04L 41/0866* (2013.01); *H04L 12/4679* (2013.01); *H04L 41/0853* (2013.01);
(Continued)

(58) Field of Classification Search
None
See application file for complete search history.

(56) References Cited

U.S. PATENT DOCUMENTS

| 5,751,967 A | 5/1998 | Raab et al. |
| 6,073,140 A | 6/2000 | Morgan et al. |

(Continued)

FOREIGN PATENT DOCUMENTS

| EP | 1249966 A2 | 10/2002 |
| JP | 00165430 | 6/2000 |
| JP | 05333546 | 12/2005 |

OTHER PUBLICATIONS

Canadian Examination Report, dated Mar. 11, 2015, Application No. 2,697,769, filed May 15, 2008; 5 pgs.
(Continued)

*Primary Examiner* — Steve R Young

(57) ABSTRACT

A method for identifying VLANs associated with a network includes gathering actual network element configuration data from a plurality of network elements in the network, wherein the actual network element configuration data identifies one or more VLANs that at least some of the plurality of network elements are actually allocated to; correlating the actual network element configuration data with administrative VLAN data; and determining one or more VLANs that are not commonly identified in both the actual network element configuration data and the administrative VLAN data. A system includes a network monitoring system operable to gather actual network element configuration data from a plurality of network elements at one or more logical network sites, wherein the actual network element configuration data identifies one or more VLANs that at least some of the plurality of network elements are actually allocated to; and a VLAN services module operable to correlate the actual network element configuration data with administrative VLAN data, and further operable to determine one or more
(Continued)

VLANs that are not commonly identified in both the actual network element configuration data and the administrative VLAN data.

17 Claims, 12 Drawing Sheets

(51) Int. Cl.
    *H04L 41/0866*     (2022.01)
    *H04L 41/0853*     (2022.01)
    *H04L 41/0859*     (2022.01)
    *H04L 41/12*     (2022.01)

(52) U.S. Cl.
    CPC .......... *H04L 41/0859* (2013.01); *H04L 41/12* (2013.01); *H04L 2012/4629* (2013.01)

(56) References Cited

U.S. PATENT DOCUMENTS

| | | | |
|---|---|---|---|
| 6,167,052 | A | 12/2000 | McNeill |
| 6,977,900 | B2 | 12/2005 | Wiedeman |
| 7,184,942 | B2 | 2/2007 | Graves |
| 7,391,719 | B2 | 6/2008 | Ellis |
| 7,421,621 | B1 | 9/2008 | Zambrana |
| 9,454,294 | B2 | 9/2016 | Sapuram |
| 2001/0005849 | A1 | 6/2001 | Boothby et al. |
| 2004/0042416 | A1* | 3/2004 | Ngo ............... H04L 41/0856 370/254 |
| 2004/0042454 | A1 | 3/2004 | Zabihi et al. |
| 2004/0044754 | A1 | 3/2004 | Virdy et al. |
| 2004/0210623 | A1* | 10/2004 | Hydrie ............... H04L 12/4641 709/201 |
| 2004/0249916 | A1 | 12/2004 | Graves |
| 2006/0013158 | A1 | 1/2006 | Ahuja |
| 2006/0200455 | A1 | 9/2006 | Wilson |
| 2006/0274744 | A1* | 12/2006 | Nagai ............... H04L 12/4645 370/389 |
| 2007/0081477 | A1* | 4/2007 | Jakkahalli ............ H04L 12/4645 370/310 |
| 2007/0110028 | A1 | 5/2007 | Wu |
| 2007/0110077 | A1* | 5/2007 | Takashige ............ H04L 41/0803 370/395.53 |
| 2009/0059930 | A1 | 3/2009 | Ryan et al. |
| 2009/0207845 | A1* | 8/2009 | Guan ...................... H04L 45/00 370/392 |
| 2011/0149800 | A1 | 6/2011 | Ryan et al. |

OTHER PUBLICATIONS

Canadian Examination Report, dated Nov. 22, 2013, Application No. 2,697,769, filed May 1, 2008; 3 pgs.
Canadian Examination Report, dated Sep. 4, 2012, Application No. 2697769, 6 pgs.
European Examination Report, dated Mar. 15, 2016, Application No. 08755533.0, filed May 15, 2008; 11 pgs.
Extended European Search Report, dated Apr. 23, 2013, EP Application No. 08755533.0, 6 pgs.
International Searching Authority, Korean Intellectual Property Office, International Search Report (Form PCTIISAI220) for international application No. PCT/USOBI063700, International Filing Pate: 15 May, 200B, , 6 Pages.
International Searching Authority, Korean Intellectual Property Office, Written Opinion of the International Searching Authority (Form PCT/ISA/237) for international application No. PCT/US OB/063700,International Filing Date: May 15, 2008 , 5 pages.

* cited by examiner

FIG. 8

VLAN Reservation System

SEARCH | ACCESS PORT | CROSSROADS | MPLS | IPVPN | ADMIN | VLANS

Last Refreshed:    Reservations:    7/19/06 5:38 PM

Network Monitoring:    8/23/06 3:01 PM

| VLAN | Dallas1 | London1 | Los Angeles1 | New York1 |
|---|---|---|---|---|
| 100 | | Serv-CompID-19 | | |
| 101 | Serv-CompID-12 | | Serv-CompID-54 | Serv-CompID-50 |
| 102 | Serv-CompID-45 | Serv-CompID-08 | | |
| 103 | Serv-CompID-37 | Serv-CompID-23 | Serv-CompID-15 | Serv-CompID-33 |
| 104 | | Serv-CompID-22 | | |
| 105 | | | | |

| Details | Dallas1 | London1 | Los Angeles1 | New York1 |
|---|---|---|---|---|
| Status | Error | Clear | Error | OK |
| Provisioning | | | Serv-CompID-17 | Serv-CompID-50 |
| Config Gen | Serv-CompID-12 | | Serv-CompID-54 | Serv-CompID-50 |
| NMS | | | | Serv-CompID-50 |
| Customer(S) | | | | PseudoCustomer1 |
| Device(s) | | | | car1.ny1 GigaEth... |

Hamburg1
Honolulu1
Houston1
LasVegas1
London1
London2
LosAngeles1
LosAngeles2
Madrid1
ManchesterUK1
Meriden1
Miami1
Milan1
Minneapolis1
Munich1
NewOrleans1
NewYork1
Newark1
Oakland1
Orlando1
Paris1
Philadelpohia1
Phoenix1

FIG. 9

SYSTEM AND METHOD FOR MANAGING VIRTUAL LOCAL AREA NETWORKS

CROSS REFERENCE TO RELATED APPLICATIONS

This application is a continuation of U.S. patent application Ser. No. 11/849,010, filed Aug. 31, 2007, now U.S. Pat. No. 10,313,191, the entire contents of which are incorporated herein by reference.

This application is also related to U.S. patent application Ser. No. 12/970,930, filed Dec. 16, 2010, which is a continuation-in-part of U.S. patent application Ser. No. 11/849,010, filed Aug. 31, 2007, the entire contents of which are incorporated herein by reference.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2007 Level 3 Communications, LLC.

TECHNICAL FIELD

Embodiments of the present invention generally relate to managing virtual local area networks. More specifically, embodiments relate to identifying and reporting VLANs. More specifically, embodiments relate to automatically discovering network components and mapping network components to VLANs to determine availability of VLANs across a network.

BACKGROUND

A Virtual Local Area Network (VLAN) is a logical network within a physical network. VLANs are often created within physical networks to facilitate the administration of the network, by separating logical segments of the network, or to reduce network bandwidth usage by reducing the broadcast domain. A VLAN includes a set of logical connections between devices in the physical network. The VLAN protocol 802.1Q promulgated by the Institute of Electrical and Electronics Engineers (IEEE) defines the meaning of VLAN and sets forth an Ethernet tagged frame definition to accommodate VLAN communication over the network. The tagged frames include a VLAN Identifier (VID) that is allocated 12 bits, which limits the number of VLANS that can exist in a physical network to a finite number, specifically 4,096. In addition, the IEEE 802.1Q standard reserves VID 0 and VID 4,095 for other purposes, so these cannot be allocated to VLANs.

As such, within a domain, the number of VLANs that can be defined is limited to 4,094. This limitation in the number VLANs essentially requires network operators to carefully manage VLANs on the network as well as the allocation of physical connections and devices to the VLANs. For example, a set of router channels, switch channels and trunks may be allocated to VLAN 101 for an enterprise requiring communication service over a backbone network. Later, when another enterprise requires a VLAN, the network operator must be able to quickly determine that VLAN 101 cannot be used and to quickly identify available router channels, switch channels and trunks for the new VLAN.

Because network usage and configurations are always changing, it may be that VLANs that were previously defined are no longer being used even though records may show otherwise. In such cases, it may be possible to reassign the unused VLAN to a new enterprise.

Conventional approaches to managing VLAN usage in a network have been largely manual in nature. For example, a provisioning engineer must manually query each device in a domain to determine if it is part of a VLAN and/or what VID it is assigned to. In large networks this process can be very time consuming. The records showing available VLANs and their assigned devices are often manually maintained. Such manual updating of records is prone to errors.

It is with respect to these and other considerations that embodiments of the present invention have been developed.

SUMMARY

Embodiments of the present invention generally relate to identifying and reporting virtual area networks (VLANs). More specifically, embodiments relate to comparing VLANs identified in actual network element configuration data gathered from the network elements to VLANs identified in one or more sets of administrative data. Some embodiments relate to automatically discovering VLANs that have been assigned or are available to be assigned, based on network element configuration and one or more sets of administrative data. At least one set of administrative data identifies VLANs that should be provisioned. Comparing actual network element configuration data can include mapping VLANs identified by network elements to VLANs identified in the one or more sets of administrative data.

Embodiments further relate to systems and methods for reporting VLANs identified in the actual network element configuration data and VLANs identified in the one or more sets of administrative data. VLANs that are identified by all the sets of administrative data and the actual network configuration data may be marked as valid. VLANs that are identified in fewer than all the sets of data may be marked as invalid. Marking VLANs as valid or invalid may involve color coding VLAN identifiers in a report.

Some embodiments relate to systems and methods for reporting VLANs identified in one or more sets of data. According to one embodiment of reporting VLANs, one or more VLANs of multiple logical sites can be presented simultaneously. The logical sites can be selected by the user. The report may further show configuration and status details of selected VLANs.

An embodiment of a method for identifying VLANs associated with a network includes gathering actual network element configuration data from a plurality of network elements in the network, wherein the actual network element configuration data identifies one or more VLANs that at least some of the plurality of network elements are actually allocated to; correlating the actual network element configuration data with administrative VLAN data; and determining one or more VLANs that are not commonly identified in both the actual network element configuration data and the administrative VLAN data.

The method may further include reporting the VLANs that should be provisioned and the VLANs that at least some of the plurality of network elements are allocated to, wherein reporting comprises indicating the one or more VLANs that are not commonly identified in both the actual network element configuration data and the administrative VLAN data. Reporting may further include indicating one or more VLANs commonly identified in both the administrative VLAN data and the actual network element configuration data. Indicating the one or more VLANs commonly identified in both the administrative VLAN data and the actual network element configuration data may include presenting the commonly identified VLANs in a first color and where indicating the one or more VLANs that are not commonly identified in both the actual network element configuration data and the administrative VLAN data comprises presenting the not commonly identified VLANs in a second color. Reporting may further include simultaneously reporting one or more VLANs identified at each of multiple logical sites.

In some embodiments of the method gathering actual network element configuration data includes polling the plurality of network elements for specified configuration data. Gathering actual network element configuration data may include gathering the actual network element configuration data from network elements at a plurality of logical sites. The method may further include determining one or more available VLANs based at least in part on the VLANs identified in the actual network element configuration data and VLANs identified in the administrative VLAN data. The administrative VLAN data may include a VLAN provisioning data store, a VLAN configuration generation data store, and a VLAN orders data store.

Still further, the method may include correlating the actual network element configuration data with predetermined network element configuration data from the VLAN configuration generation data store, wherein correlating comprises identifying differences between the actual network element configuration for a selected VLAN and the predetermined network element configuration for the selected VLAN. Gathering actual network element configuration data may recur automatically according to a specified time interval. One or more of the gathering, correlating and reporting operations may occur automatically according to a schedule.

An embodiment of a system includes a network monitoring system operable to gather actual network element configuration data from a plurality of network elements at one or more logical network sites, wherein the actual network element configuration data identifies one or more VLANs that at least some of the plurality of network elements are actually allocated to; and a VLAN services module operable to correlate the actual network element configuration data with administrative VLAN data, and further operable to determine one or more VLANs that are not commonly identified in both the actual network element configuration data and the administrative VLAN data.

The system may further include a VLAN management user interface operable to report VLAN status determined by the VLAN services module. The VLAN management user interface may be further operable to issue a notification that a VLAN is reserved. Still further, the VLAN management user interface may be operable to receive a reservation request to reserve a specified VLAN. The VLAN services modules may be further operable to reserve the specified VLAN by marking the VLAN as reserved, assigning the VLAN to an entity, and allocating one or more specified network elements to the specified VLAN.

Further still, the VLAN management user interface may be configured to receive a release request to release a specified VLAN that is currently reserved, and wherein the VLAN management services module is further operable to responsively release the specified VLAN. The VLAN management user interface may further still be operable to simultaneously present VLAN status of VLANs for multiple selected logical network sites. The VLAN management user interface may further enable a user to specify the multiple selected logical network sites. The user may specify multiple VLAN IDs for reservation at one or more logical network sites. The system can reserve the multiple VLANs substantially simultaneously.

Yet further, the system may include a VLAN orders data store including data related to VLANs that have been ordered; a VLAN provisioning data store including data related to VLANs that have been provisioned; and a configuration generation data store storing data related to network element configurations, wherein the VLAN network services module is operable to correlate data from the VLAN orders data store, the VLAN provisioning data store and the configuration generation data store.

BRIEF DESCRIPTION OF THE DRAWINGS

FIGS. 4-9 illustrate exemplary user interfaces for reporting VLAN status, and reserving and releasing VLANs.

Figure 1:
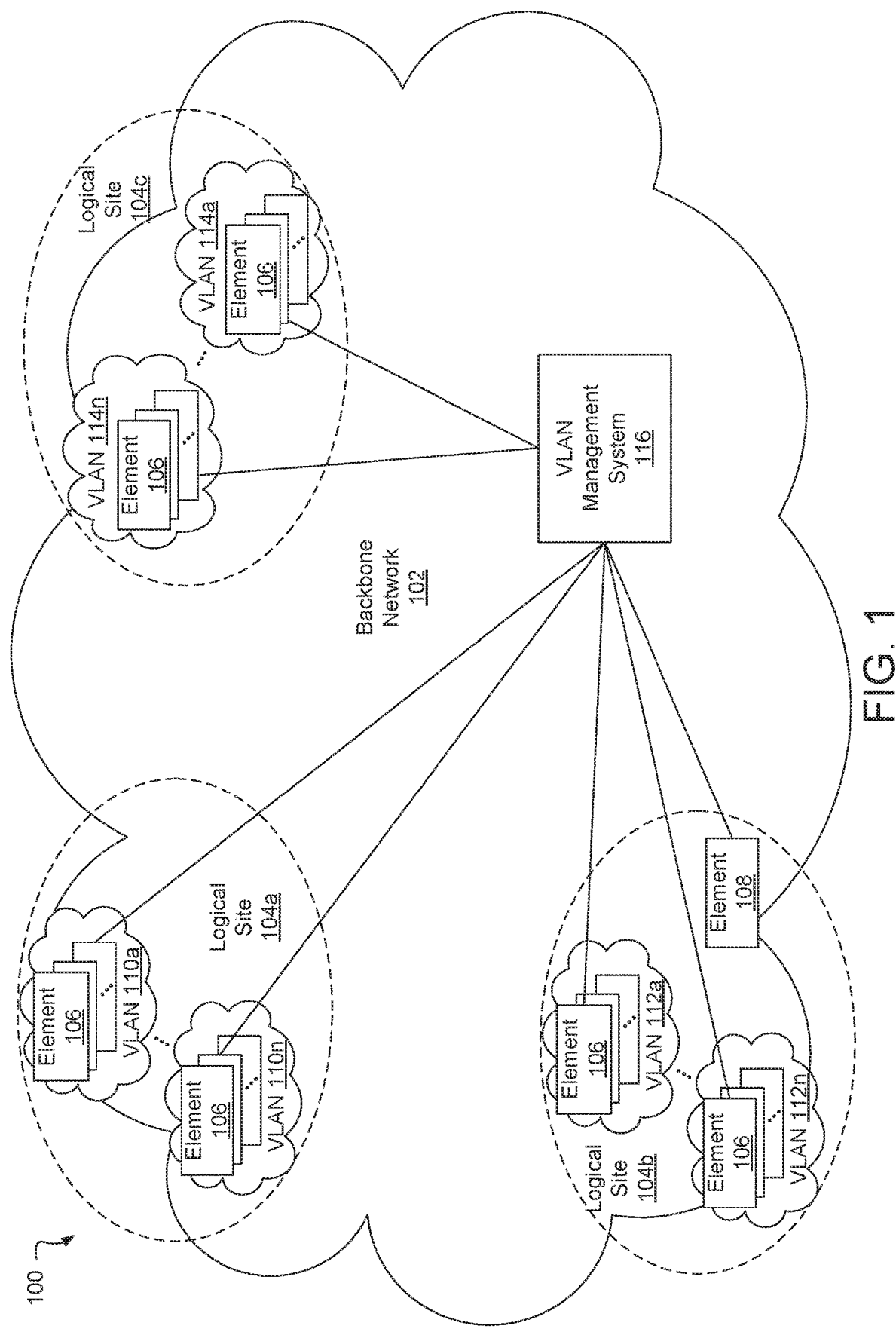
FIG. 1 illustrates an operating environment suitable for practicing embodiments of the present invention.

While the invention is amenable to various modifications and alternative forms, specific embodiments have been shown by way of example in the drawings and are described in detail below. The intention, however, is not to limit the invention to the particular embodiments described.

DETAILED DESCRIPTION

Embodiments of the present invention generally relate to identifying and reporting virtual area networks (VLANs). More specifically, embodiments relate to correlating different sets of VLAN related data, including data gathered from actual network elements, to determine whether each of one or more VLANs are available or unavailable. Correlating VLAN related data may involve determining whether each of a plurality of VLANs at a logical site have been commonly identified in different sets of VLAN related data. Embodiments may further include comparing data associated with commonly identified VLANs to determine whether the different sets of VLAN related data are consistent. This may involve comparing VLAN related data associated with VLANs identified in actual network element configuration data to data associated with VLANs identified in one or more sets of administrative data.

Some embodiments relate to automatically discovering network element configurations to determine whether network elements have been allocated to one or more VLANs in the network. Embodiments further relate to determining whether VLANs at one or more logical sites have been assigned to an entity, such as a business organization. Embodiments may further involve notifying a user whether or not a VLAN is available to be assigned. At least one set of administrative data identifies VLANs that have been determined through business processes have been or should be provisioned. Comparing actual network element configuration data can include mapping VLAN related data associated with a VLAN identified by network elements to VLAN related data associated with VLANs identified in the one or more sets of administrative data.

Embodiments further relate to automatically gathering network element configuration data from network elements in one or more logical sites. Logical sites may include geographical regions, metropolitan markets, business sites, or others. For each of the logical sites, each of a possible 4,096 VLANs is analyzed to determine status of the VLANs. Status may include availability of the VLAN for reservation. Status may further include an indication whether different sets of VLAN related data are consistent as to each VLAN in the one or more logical sites.

Embodiments further relate to systems and methods for reporting VLANs identified in the actual network element configuration data and VLANs identified in the one or more sets of administrative data. VLANs that are identified by all the sets of administrative data and the actual network configuration data may be marked as valid. VLANs that are identified in fewer than all the sets of data may be marked as invalid. Marking VLANs as valid or invalid may involve color coding VLAN identifiers in a report.

Some embodiments relate to systems and methods for reporting VLANs identified in one or more sets of data. The report may further present additional details of selected VLANs. Details may include customer(s) assigned to a selected VLAN, device(s) allocated to the selected VLAN. According to one embodiment of reporting VLANs, sets of one or more VLAN status are presented simultaneously for each of multiple logical sites. For example, status of VLANs at two metropolitan markets may be presented simultaneously. The logical sites can be selected by the user.

Embodiments further relate to systems and methods for receiving a VLAN reservation request and responsively reserving a specified VLAN. The VLAN reservation request may be received from a user through a user interface. Reserving the VLAN may involve marking a VLAN identifier as reserved in a data store of VLAN identifiers. Reserving may further involve assigning the specified VLAN to a selected entity. Reserving may further involve allocating one or more selected network elements to the specified VLAN.

Embodiments may further allow for releasing a VLAN that was previously reserved. Releasing a VLAN may involve unmarking a VLAN identifier in a data store of VLAN identifiers, deallocating network elements from the previously reserved VLAN, and unassigning the previously reserved VLAN from an entity previously assigned to the VLAN.

Embodiments of systems and methods may be operable to issue a notification that a VLAN is currently reserved. Embodiments may further prompt for a request to override a current reservation. If an override request is received, the currently reserved VLAN is released, and the VLAN is reserved.

Prior to describing one or more preferred embodiments of the present invention, definitions of some terms used throughout the description are presented.

Definitions

The term "provisioning" or "provision" refers to setting up a resource for use a network. Provisioning can be automatic or manual or a combination thereof.

A "module" is a self-contained functional component. A module may be implemented in hardware, software, firmware, or any combination thereof.

The terms "connected" or "coupled" and related terms are used in an operational sense and are not necessarily limited to a direct connection or coupling.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phrases do not necessarily refer to the same embodiment.

If the specification states a component or feature "may", "can", "could", or "might" be included or have a characteristic, that particular component or feature is not required to be included or have the characteristic.

The terms "responsive" and "in response to" includes completely or partially responsive.

The term "computer-readable media" is media that is accessible by a computer, and can include, without limitation, computer storage media and communications media. Computer storage media generally refers to any type of computer-readable memory, such as, but not limited to, volatile, non-volatile, removable, or non-removable memory. Communication media refers to a modulated signal carrying computer-readable data, such as, without limitation, program modules, instructions, or data structures.

Exemplary System

FIG. 1 illustrates a backbone network 102 spanning multiple logical sites 104. At one or more of the logical sites 104 VLANs are composed of logical configurations of network elements 106. A network element 106 is generally any type of network resource that can facilitate communications, and can include hardware, software, firmware components or any combination thereof. By way of example, but not limitation, a network element 106 could be a router, switch, server, gateway, port (e.g., router or switch port), appliance, or channel. One or more network elements 106, or parts of network elements 106, within a logical site 104 can be configured to form a logical network, referred to as a virtual local area network (VLAN). Some network elements, such as network element 108, may not be part of a VLAN; e.g., network element 108 may not be allocated to a VLAN.

A logical site 104 is any administratively useful logical area in the network 102 or on the edge of the network 102, and can correspond to, by way of example, but not limitation, a geographic region, a metropolitan market or a business site. Thus, for example, the cities of San Jose, Calif., New York City, N.Y., Denver, Colo., and others may each include one or more logical sites in which VLANs can be defined. According to one embodiment, in each logical site 104a there can be up to $2^{12}$ (4,096) VLANs defined. In FIG. 1, VLANs at different regions 104 are called out with different numbers for illustrative purposes. For example, logical site 104a is depicted as including VLAN 110a through VLAN 110n; logical site 104b includes VLAN 112a through VLAN 112n; and logical site 104c includes VLAN 114a through 114n, wherein the letters 'a' . . . 'n' have no inherent significance.

In the embodiments illustrated herein, VLANs are created in or at edges of a backbone network 102. Each of the 4,096 VLANs (minus any VLANs that not useable under IEEE 802.1Q) that can be used within a logical site 104 may be assigned to a particular entity, such as a corporation or other organization. In this fashion, an entity assigned to a VLAN uses the VLAN to access the backbone network 102 and ultimately the Internet, for example. With further regard to the definition of VLANs, those skilled in the art will understand how a VLAN could be defined; e.g., how one or more network elements 106 might be included or configured in any particular VLAN and how the network elements, or portions of elements, may be arranged and configured to form the VLAN.

Figure 2:
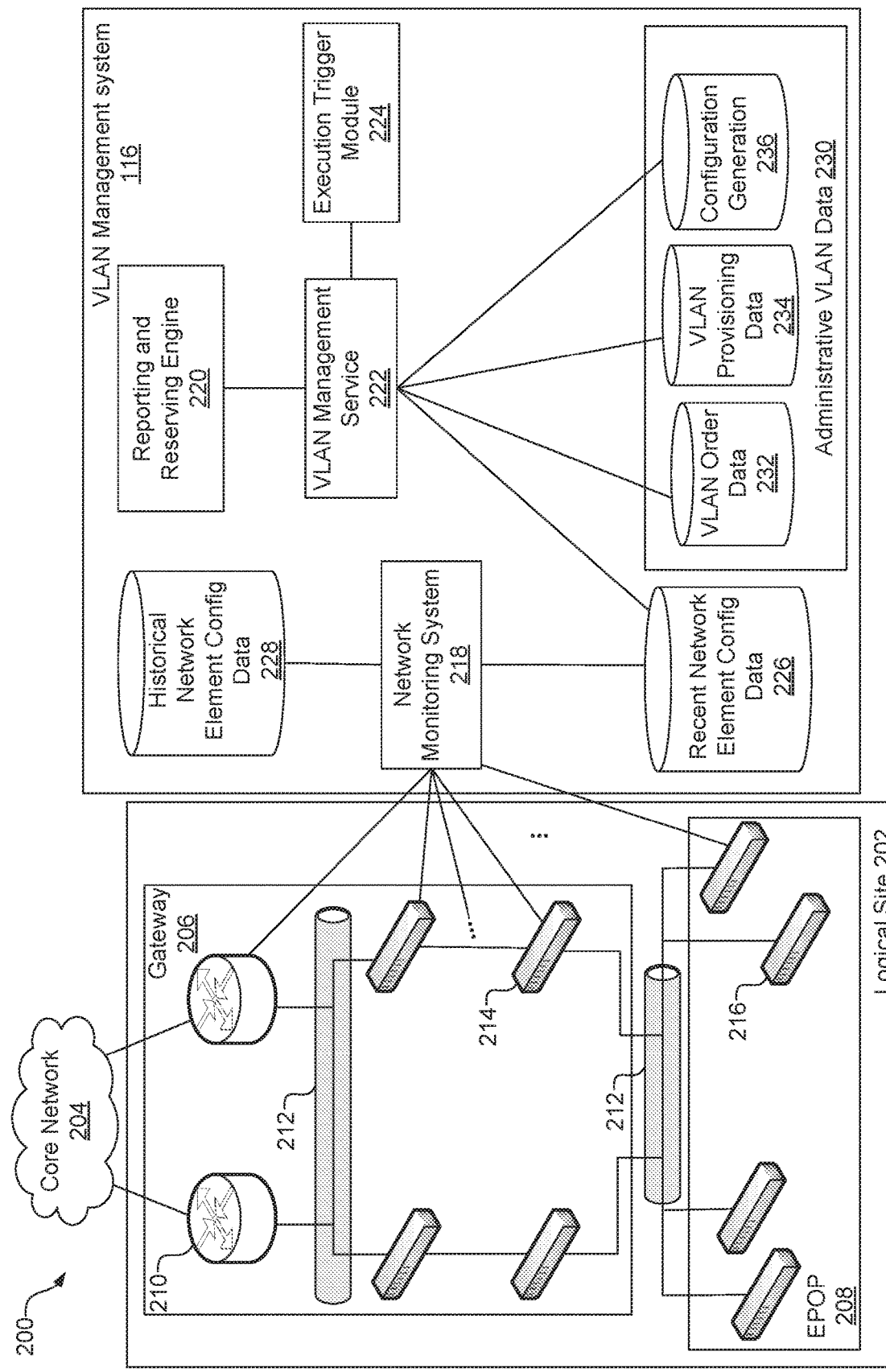
FIG. 2 illustrates a system for identifying and reporting VLAN status in accordance with the operating environment of FIG. 1.

By way of example, but not limitation, in various embodiments a VLAN may be created at the interconnection of a gateway of the backbone network 102 and a metropolitan area switch or extended point of presence (EPOP) that connects to an entity assigned to the VLAN (see, e.g., FIG. 2). In this case, the VLAN may be formed from ports on one or more routers through the gateway, a trunk to the metropolitan area switch that is connected to the assigned entity, and ports on the metropolitan switch. The VLAN is assigned an available VLAN identifier (VID), which is a number from 1 to 4,095. The VID can be used to determine the logical network defined by the routers, router ports, the trunk, the metro switch and the metro switch ports. Data (e.g., packets or frames) communicated to and from the assigned entity are typically labeled (or tagged) with the associated VID so that the data is properly routed through the metro switch, across the trunk, and through the gateway routers that form the VLAN. Multiple VLANs typically run across each trunk. To further illustrate, an exemplary configuration is illustrated in FIG. 2 and described further below.

In order to use a VLAN at a logical site, a network administrator or provisioning engineer determines what VIDs are available at the logical site. For example, an entity may place an order for a VLAN at a logical site. In response, the network administrator or provisioning engineer attempts to determine an available VID. If a VLAN has been defined and assigned a VID and is in use, then the VID is unavailable at the logical site. At a logical site, if a VLAN has been defined, network elements have been allocated to the VLAN, and the VLAN is assigned to an entity, the VLAN is considered to be "consumed" at that logical site; i.e., once a VLAN is consumed at logical site, the VLAN is typically no longer available for assignment to another entity (however, it is possible to reassign the VLAN to another entity).

Sometimes it can be difficult to determine whether a VLAN has been consumed, or whether a given network element is available within the network to create another VLAN. For example, although records may show that a VLAN has been assigned to an entity, the entity may no longer be using the VLAN. As another example, a network element configuration may change such that the network element is no longer allocated to a VLAN or becomes allocated to a VLAN. In some cases network element discovery is automated for network elements of a single vendor; e.g., automated discovery of only Cisco™ devices. However, in conventional systems where devices from multiple different vendors are used, network administrators or provisioning engineers often had to go through a painstaking task of manually querying network elements for configuration information in order to identify VLANs that were in use, in order to then identify what VLANs were available and resources that could be assigned to a VLAN.

In the present embodiment, a VLAN management system 116 correlates different sets of VLAN related data to identify VLANs, determine status of VLANs and report the status of the identified VLANs, so that network provisioning engineers can readily determine VLANs that are being used, VLANs that are available, and what elements are, or can be, allocated to VLANs in the network. The VLAN management system 116 also reserves or releases VLANs based on user input. Identifying VLANs typically involves determining if one or more network elements have been allocated to a VLAN(s), and if so, what VLAN(s) the network elements are allocated to. To do this, the management system 116 monitors the state of the network 102 and correlates actual network element configuration data with VLAN business or administrative data, including provisioning data, orders data, and configuration data. Embodiments of these are discussed in further detail below. The VLAN management system 116 can also detect errors in the network configuration and provisioning or VLAN definition records (e.g., the most recently obtained network configuration does not match records showing what elements are allocated to a VLAN). Beneficially, the VLAN identification and reporting can be performed automatically.

FIG. 2 illustrates an exemplary network arrangement 200 including network elements at a logical site 202 providing communication to and from a core network 204, and an embodiment of a VLAN management system 116. The core network 204 is typically part of a broader network, such as backbone network 102 of FIG. 1, and performs core routing functions for communications traversing the gateway 206. The logical site 202 includes a gateway 206 and an EPOP 208.

For ease of illustration only a small number of network elements are shown in the gateway 206 and the EPOP 208; however, in an actual network implementation, many more network elements would exist. In this particular embodiment the gateway 206 includes routers 210, an Ethernet trunk 212 and Internet protocol switches 214. IP switches 214 are typically located at a collocation center that provides a common site for interconnection of numerous networks and providers. EPOP 208 includes a number of metropolitan (metro) switches 216. Ethernet trunks 212, IP switches 214, and metro switches 216 may support, for example, 1 or 10 Gigabit Ethernet.

The routers 210, trunks 212, IP switches 214 and metro switches 216 are typically provisioned and configured for operation. Configuring these network elements may be automatic or manual or any combination thereof. As mentioned, configuring the network elements can involve allocating the network elements or portions thereof to a VLAN. For example, a port on a router 210 may be allocated to a VLAN having VID 174 (or some other number between 1 an 4,094). The VLAN management system 116 can determine whether and how the network elements (e.g., routers 210, trunks 212, IP switches 214 and metro switches 216) are actually allocated to VLANs by gathering configuration data from the network elements themselves. Furthermore the VLAN management system 116 can correlate the data obtained from the network elements with one or more sets of administrative VLAN data to determine differences and similarities between the actual VLAN settings and administratively recognized VLAN settings.

The exemplary VLAN management system 116 shown in FIG. 2 includes a number of components or modules that may be implemented in hardware, software, firmware or any combination thereof. For example, some components may be implemented in one or more computer servers and data stores. These components may be geographically distributed or centralized. In this embodiment, the VLAN management system 116 includes a network monitoring system (NMS)

218, a reporting and reserving engine 220, a VLAN management services module 222, and an execution trigger module 224.

The NMS 218 is in operable communication with the network elements at the logical site 202 and is operable to gather network element configuration data from the network elements. For ease of illustration, not all connections are shown between the NMS 218 and all the network elements, but the NMS 218 is configured to communicate with all the network elements. In addition, the NMS 218 is typically connected to many other logical sites (e.g., via the core network 204) in addition to the logical site 202 shown in FIG. 2, and can even be connected to all network elements in the broader backbone network, so that the NMS 218 can capture network element configuration data for all logical sites in an entire network.

The NMS 218 gathers network element configuration data, such as, but not limited to, network element serial number (or other identifier), interface type (e.g., Gigabit Ethernet), IP address, and VLAN identifier. The NMS 218 stores the gathered network element configuration data in a recent network element configuration data store 226. The network element configuration data gathered and stored in the network element configuration data store 226 is referred to as "actual network element configuration data", because it represents a recent actual configuration of network elements.

In some embodiments the NMS 218 also maintains historical network element configuration data in a historical network element configuration data store 228. The NMS 218 may, for example, periodically poll the network elements for network element configuration(s) and store the data in the recent network element configuration data store 226, and copy the previous set of network element configuration data from the data store 226 to the historical network element configuration data store 228. Later, when changes or problems are observed at the logical site 202, the historical network element data store 228 can provide a reference to facilitate identification of reasons for changes or problems. In addition the historical network element configuration data from store 228 can be used to revert to a prior network configuration.

Typically, network administrators attempt to track the provisioning and configurations of VLANs in business and administrative records that document changes as they are made. For example, an entity may order a VLAN, and the VLAN may be reserved and provisioned. This order, reservation and provisioning is documented in administrative records. More specifically VLAN related data associated with business processes are captured in administrative records. In this embodiment, these administrative records are collectively referred to as administrative VLAN related data 230 (or simply administrative VLAN data 230).

Administrative VLAN data 230 may be viewed as business data that is/was generated and stored during the administration of VLANs in the network, such as during the process of taking orders for VLANs, determining network element configurations for VLANs, assigning VLANs to entities (e.g., companies or other organizations). For any number of reasons, the actual VLAN status or configuration at the logical site 202 may not agree with the VLAN status or configuration that is stored in administrative records. For example, a VLAN could actually be being used by one entity, but business records (in the administrative VLAN data 230) may indicate that the VLAN is assigned to another entity. As another example, the actual configuration of network elements in a VLAN may be inconsistent with the configuration that network administrators believe exists or should exist as indicated in the administrative VLAN data 230. Inconsistencies may arise, for example, due to changes that are made to network element configurations without these changes being noted in the administrative records. As another example, testing of network elements may leave them in an unknown state. As yet another example, VLAN related changes that administrators believe are made to logical site (and recorded in the administrative VLAN data 230), may not actually be made.

In the illustrated embodiment, the administrative VLAN data 230 includes a VLAN order data store 232, a provisioning data store 234, and a configuration generation data store 236. Any of the data stores may be composed of one or more data stores. For example, the VLAN order data store 232 may consist of data in an order entry system and data in a sales system, which may be distributed throughout a network service provider enterprise. Thus, each of the data stores may be logical assemblies of multiple sets of data.

In general, the VLAN order data store 232 includes order data related to orders for VLANs. The VLAN order data store 232 is typically populated by an order entry system and/or sales system of the network service provider. The configuration generation data store 236 is operable to, or is used to, generate a network elements configuration(s) for a VLAN. The configuration generation data store 236 is vendor neutral, meaning that is can accept many different attribute inputs (IP addresses, VLANS, etc.) and generate configuration(s) that designate particular device criteria, such as, but not limited, vendor, brand or model. The configuration(s) generated by the configuration generation data store 236 are applied to the network elements (e.g., routers and devices in the network). The VLAN provisioning data store 234 includes a superset of the VLAN related data from the other administrative VLAN data stores.

The data stores may store data in any of a number of formats, such as, but not limited to, flat files, object oriented or hierarchical. The data stores may be implemented using Structured Query Language (SQL), Oracle database format, or otherwise. Generally, the data stores include data in the form of logical data objects. Each data object includes one or more data fields. The data fields are logically linked to each other to form the object, and are not necessarily stored together. For example, a data object may be a linked list of data fields, or a set of pointers to the associated data fields. The data fields store (or reference) VLAN related data associated with administratively recognized VLANs (e.g., as in the administrative VLAN data 230) or actually identified VLANs (e.g., as in the recent network element configuration data 226).

The data fields store data of various data types. More than one of the data stores may include one or more of the same types of data along with different types of data. For example, the recent network element configuration data store 226 typically contains VLAN identifiers (VIDs) for network elements and the VLAN provisioning data store 234 typically contains VLAN identifiers for VLANs that business processes indicate are (or should be) provisioned. Although the certain types of data may be stored in more than one data store, the data may be formatted in different formats.

Figure 3:
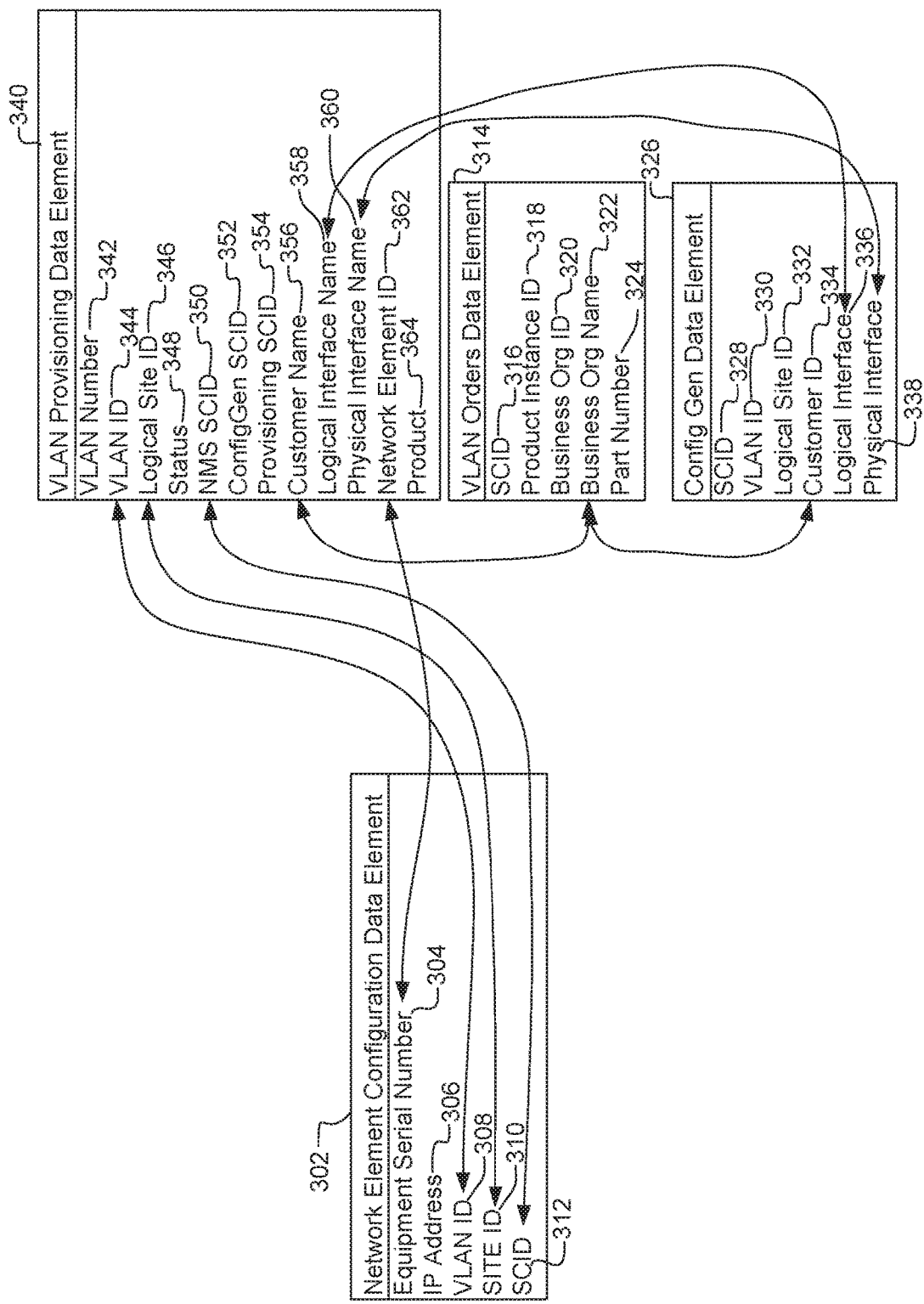
FIG. 3 illustrates exemplary data elements that may be stored in a network element configuration data store, a VLAN provisioning data store, a VLAN orders data store, and a configuration generation data store.

Exemplary data objects that may be stored in the data stores shown in FIG. 2 are illustrated in FIG. 3 in accordance with one embodiment. Each data object includes a set of exemplary data fields. The recent network element configuration data store 226 may include multiple network element configuration objects 302. Each network element configuration data object 302 corresponds to a network element.

Typically there will be one network element configuration data object 302 stored for each network element that is polled at the logical site 202 (and other logical sites connected to the NMS 218).

The network element configuration data object 302 includes an equipment serial number field 304, and IP address field 306, a VLAN ID field 308, and site ID field 310, and a service component ID (SCID) field 312. The equipment serial number field 304 stores the equipment serial number of the network element. The IP address 306 is the IP Address of the network element. The VLAN ID field 308 stores a VLAN identifier that identifies the VLAN to which the network element is allocated, if at all. The VLAN ID field 308 corresponds to the VID of the VLAN at the logical site 202. If the network element is not allocated to a VLAN, then the VLAN ID field 308 will store a "null".

The Site ID field 310 identifies the logical site 202. This may be an alphanumeric code corresponding to logical site 202; e.g., three or four letters of the city name of the logical site 202. The service component ID field 312 stores an identifier of a billable network-based service or product that can be associated with a network element, entity, VLAN ID or other data. Service component IDs are typically also used in service and sales contracts, and hence can be used to associate a network service provider's billable services to sales or services to customers. As is shown in FIG. 3 and discussed further below, the order data 232, provisioning data 234, and configuration generation data 236 each have a field for a service component ID.

In one embodiment, the VLAN orders data store 232 stores a plurality of VLAN orders data objects 314. Each VLAN orders data object 314 includes a SCID 316. As with other data objects, the SCID field 316 identifies a billable network-based service or product. The SCID field 316 includes a unique value assigned to the service component. A product instance ID (PIID) field 318 identifies a particular instance state of the service or product identified by the SCID field 316. The PIID field 318 may be viewed as the post-provisioned state against which all future changes will be made. As such, in this embodiment the value in one or the other of the SCID field 316 or the product instance ID field 318 uniquely identifies a service component. The VLAN orders data object 314 also includes a business organization ID field 320 and a business organization name 322. The business organization ID field 320 and name field 322 specify which entity (e.g., business organization) the order is associated with. A part number field 324 identifies a particular product related to the order.

In one embodiment, the VLAN configuration generation date store 236 includes a plurality of Config Gen data objects 326. Each Config Gen data object 326 includes a SCID field 328, a VLAN ID field 330, a Logical Site ID field 332, a customer ID field 334, which have been described above. The config gen data object 326 also includes a logical interface field 336 and a physical interface field 338. A logical interface is a network interface that is logically formed in the VLAN associated with the VLAN ID 330 at the Logical site 332. The physical interface 338 corresponds to the physical network element interface that is used to implement the logical interface. Some examples are shown below, with various levels of detail:

Example 1

Physical Interface:
RouterA
port Gigabit Ethernet1/1.

Logical Interface:
RouterA
interface Gigabit Ethernet1/1.100 (100=VLAN ID)

Example 2

Physical Interface:
interface GigabitEthernet6/23
description BBBL36186::BULINK, INC
no ip address
no ip redirects
no ip directed-broadcast
no shutdown
fair-queue
storm-control broadcast level 0.34
mls qos trust dscp
no cdp enable
Logical Interface:
!
interface GigabitEthernet6/23.107
description BBBL36185::BULINK, INC
encapsulation dot1Q 107
ip address 4.79.xx.233 255.255.255.252
no ip directed-broadcast
no ip proxy-arp
no cdp enable
mls netflow sampling
no shutdown Each data object in the VLAN provisioning data store 234 includes at least one data type (and usually two or more) that is common to each of the other data stores. This enables mapping of data across different data stores, and further enables correlating data of different data stores in order to determine inconsistencies and commonalities. In one embodiment, the VLAN provisioning data store 234 includes a plurality of VLAN provisioning data objects 340. In this embodiment there is a VLAN provisioning data object for each VLAN in the network. Each VLAN in the network has an associated number that is unique network wide. As such, the VLAN number field 342 designates the particular VLAN. Each VLAN can be uniquely identified by a VLAN ID (e.g., the associated VID defined in IEEE 802.1Q) and logical site pair (VID/logical site pair). Therefore, each VLAN provisioning data object 314 includes a VLAN ID field 344 and a logical site ID field 346. The VLAN ID field 344 ranges in value from 1 to 4,094; the logical site ID field 346 identifies the logical site of the VLAN identified by VLAN number 342.

A status field 348 indicates the status of the VLAN. In one embodiment the status indicates whether there is consistency or inconsistency in VLAN data across the multiple data stores. The status field 348 may take on any one of multiple values, such as, but not limited to, "OK", "VALID", "RESERVED", "INVALID", or "ERROR". An NMS SCID field 350 stores the SCID of a corresponding data object in the network element configuration data store. More specifically, the NMS SCID field 350 contains the SCID 312 of the network element configuration data object that has a VLAN ID 308 and site ID 310 that correspond to VLAN ID 344 and Logical Site ID 346, respectively.

A ConfigGen SCID field 352 stores the SCID value from the SCID field 320 in the config gen data object 326 that corresponds to the VLAN ID 344 and logical site ID 346. The Provisioning SCID 354 is the SCID associated with the VLAN provisioning data object 340, which is typically entered or specified during the VLAN ordering or provisioning process. In one embodiment the VLAN management service 222 (FIG. 2) reconciles the Provisioning SCIDs 354 with configured SCIDs and/or ordered SCIDS on a periodic basis (e.g., nightly). The VLAN Provisioning Data object 340 also includes a customer name field 356, a logical interface name field 358, and a physical interface name field 360, which identify the associated business entity, logical interface and physical interface, respectively. The VLAN Provisioning data object 340 also includes a network element ID field 362, which identifies the network element associated with the VLAN ID 344 at the logical site 346. A product field 364 includes data identifying a particular product associated with the VLAN having VLAN ID 344.

One or more data fields in the data objects of each data store can be mapped to one or more data fields in the data objects of other data stores in a correlation process. In FIG. 3 there are shown just a few possible mappings between the different data objects that can be carried out during the VLAN data correlation process. For example, the equipment serial number 304 of each network element configuration data object 302 can be mapped to a corresponding network element ID 362 in a VLAN provisioning data object 340. The VLAN ID 308, Site ID 310 and SCID 312 of each network element configuration data object 302 can then be mapped to the VLAN ID 344, the logical site ID 346 and the NMS (Network Monitoring System) SCID 350, respectively, in order to determine consistencies or inconsistencies between actual network element configuration and the configuration stored during business and administrative processes (e.g., ordering, provisioning, allocating and assigning of VLANs).

As another example, Business Org Name 322 of a VLAN Orders Data Object 314 can be mapped to the customer name 356 of one or more VLAN Provisioning Data objects 340 and/or the customer ID 334 of one or more Config Gen data objects 326. As yet another example, logical interface name 358 and the physical interface name 360 of the VLAN provisioning data object 340 can be mapped to the logical interface 336 and the physical interface 338 of the config gen data object 326, respectively. Other possible mappings are shown below, wherein ⇔ indicates a mappable correspondence between sets of data:

VLAN provisioning data object 340 to network element configuration data object 302:
  Logical Interface Name 358⇔IP Address 306
VLAN provisioning data object 340 to config gen data object 326:
  Customer Name 356⇔Customer ID 334
  ConfigGen SCID 352⇔SCID 328
VLAN orders data object 314 to VLAN Provisioning data object 340:
  Part Number 324⇔Product 364

Referring again to FIG. 2 more specifically, the VLAN management system 116 includes functionality for correlating different sets of VLAN data. In general, correlating refers to mapping corresponding data fields between multiple data stores and determining commonalities and inconsistencies between different sets of VLAN data. The VLAN management system is also operable to present VLAN status and configuration data and enable a user to reserve or release a VLAN at the logical site 202 or another logical site. The correlating function is carried out by the VLAN management services module 222. The VLAN management services module 222 transmits results of the correlation to the reporting and reserving engine 220. In this embodiment, the reporting and reserving engine 220 is essentially a user interface outputting data to, and receiving data from, a user.

In some embodiments, data is pushed from the VLAN management services module 222 to the reporting and reserving engine 220. For example, results from correlation of the various data sets could be uploaded to the reporting and reserving engine 220 periodically. The VLAN management services module 222 typically performs the data correlation at regular time intervals. For example, the execution trigger module 224 can send a command to the VLAN management services module 222 to being VLAN data analysis. The execution trigger module 224 may be a "cron" job in a Unix platform, or some other timing mechanism that causes the VLAN management services module 222 to carry out the data correlation. For example, VLAN analysis (e.g., data correlation) may be triggered in the VLAN management services module 222 every 15 minutes or some other specified time interval.

Accordingly, in various embodiments, the VLAN management services module 222 automatically correlates data in the recent (actual) network element configuration data store 226 with one or more of the data sets in the administrative VLAN data 230 or correlates data from the data stores in the administrative VLAN data 230. For example, in one scenario the VLAN management services module 222 loads data from the recent network element configuration data store 226, the provisioning data store 234 and the configuration generation data store 236 and correlates VLAN identification, logical site identification and service/product identification provided by each of those data stores. Because the formats used by the different data stores may be different, the VLAN services module may reformat the sets of data into a neutral format. In some embodiments, the VLAN management services module 222 stores VLAN status and/or other VLAN related data in the VLAN provisioning data store 234.

Exemplary Graphical User Interface

FIGS. 4-9 illustrate exemplary graphical user interfaces for reporting VLAN status and enabling reserving and releasing of VLANs. The GUIs may be implemented by a VLAN management system such as VLAN management system 116 shown in FIG. 1.

Figure 4:
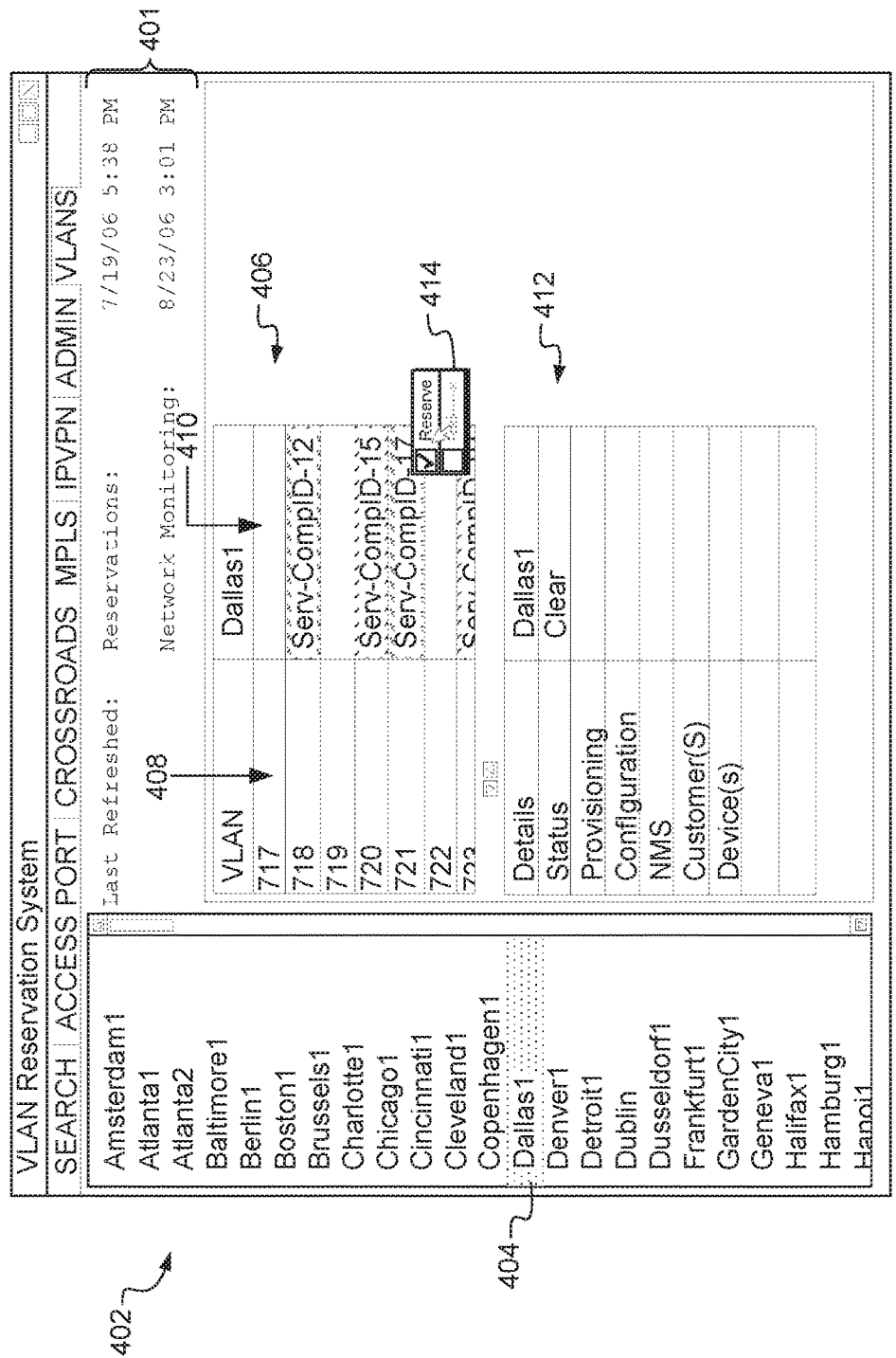

The GUI 400 of FIG. 4 includes freshness data 401 indicating when the network monitoring system last gathered network element configuration data from the network elements, and when the VLAN management services last updated the VLAN reservations data. The GUI 400 further includes a list of logical sites 402. In this embodiment, the list 402 is scrollable and logical sites are selectable therefrom. The user can select one or more logical sites from the list 402 to have the status of VLANs of the selected logical site presented. For example, in the illustrated scenario Dallas1 404 has been selected. This embodiment allows for multiple logical sites at each metropolitan market. A VLAN status table 406 includes a list 408 of VLAN identifiers (VIDs) and a list 410 of corresponding statuses. The list 410 of statuses may also include associated service component IDs.

The status can be indicated by a designated color or no color to indicate an available VLAN. For example, VLAN ID 718 may have a "green" (VALID) status, as indicated by lower-left to upper-right cross-hatching. VLAN ID 718 is also associated with Service Component ID 12. For ease of illustration, the figures shown here include a two digit identifier (e.g., 12); however, typically service component IDs will include a sufficient number of bits or alphanumeric symbols to allow for thousands of unique service component IDs. For example, in some embodiments each SCID is a series of nine alphanumeric symbols.

A VLAN details table 412 provides a more detailed explanation of a selected VLAN. In this embodiment, if the user hovers the pointing tool 414 (e.g., mouse arrow) over a VLAN in the VLAN list 408, the details shown in the details table 412 correspond to the VLAN that the pointing tool 414 is over. The VLAN details table 412 shows status, provisioning SCID, configuration SCID, network element configuration SCID, customer(s), and device(s) associated with the selected VLAN.

By contrast to VLAN 718 shown in the GUI 400, VLAN 720 in the Dallas1 logical site has an ERROR status as indicated by a red color code, herein shown with upper-left to lower-right cross-hatching. The error status may arise for any number of reasons. Sometimes the error arises because the SCID of a VLAN data element in one data store does not match the SCID of a corresponding data element of another data store. In the illustrative example, Service Component ID 15 was found to be associated with VLAN 720 in at least one VLAN data store or network elements were allocated to VLAN 720.

In the illustrated example, VLAN 722 of logical site Dallas1 is available as indicated by the "Clear" status. A reservation/release tool 414 pops up over a selected VLAN status field in table 406 when the user right clicks over the selected status field. Through the reservation/release tool 414 the user can reserve the selected VLAN or release the VLAN from reservation if it is reserved. If the user opts to reserve the available VLAN 722, another GUI 500 is presented that enables the user to assign the VLAN 722 to an entity.

Figure 5:
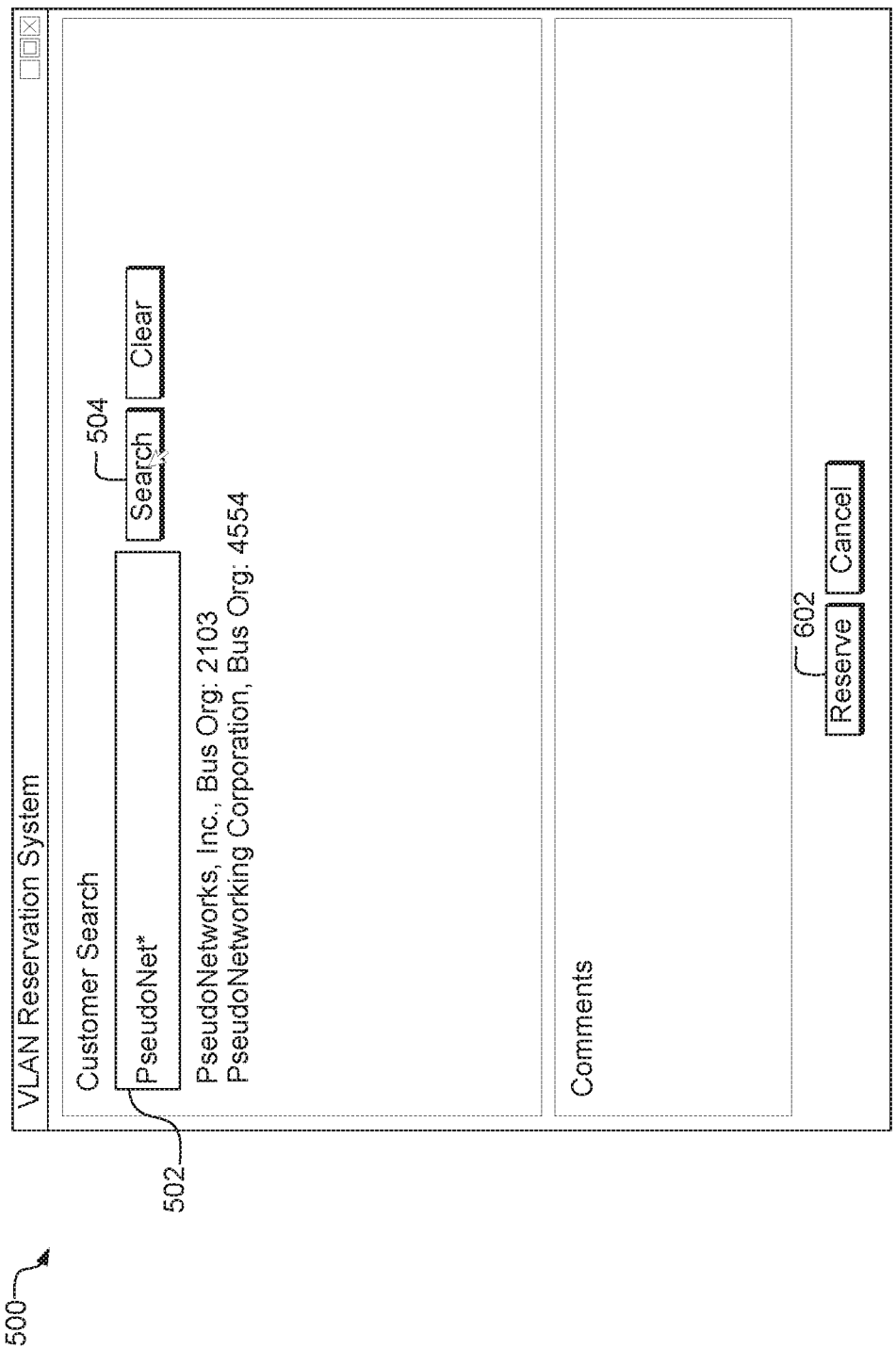

Referring to FIG. 5, the GUI 500 includes an entity ID entry field 502 in which the user enters a name or other identifier for the desired entity. After entering the identifier (or a portion thereof with a wild card indicator, "*"), the user selects a "Search" button 504 to search a data store of entity names for the entered entity identifier. In the illustrated scenario, two entity names, "PseudoNetworks, Inc." and "PseudoNetworking Corporation", are found. The user may then select one of the found entity names and reserve the VLAN.

Figure 6:
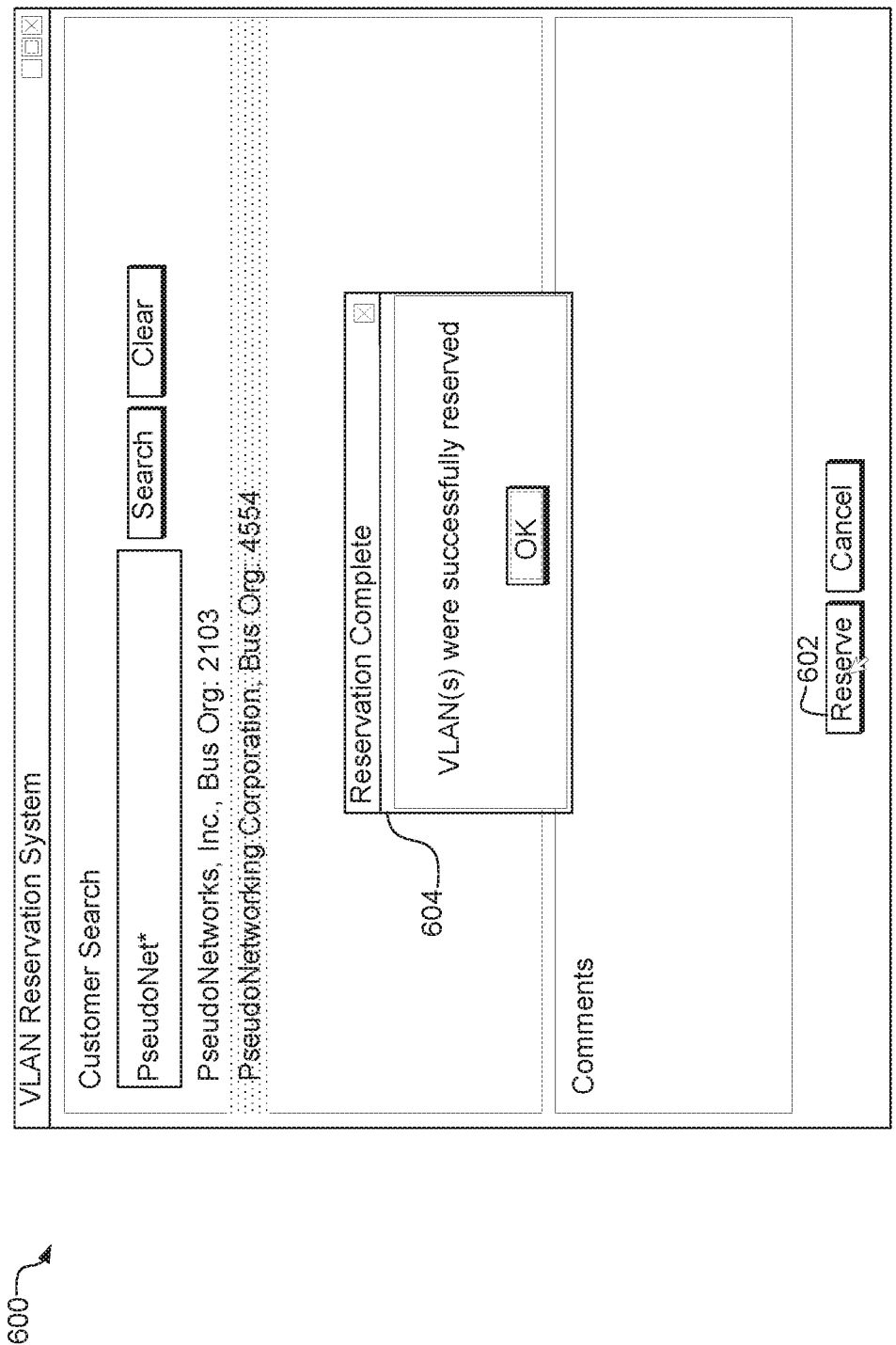

This is shown in FIG. 6 through GUI 600. In this scenario, the user has selected "PseudoNetworking Corporation" for assignment to VLAN 722. The user then selects a "Reserve" button 602. Upon selection of the Reserve button 602, the VLAN 722 is assigned to "PseudoNetworking Corporation", which in some embodiment involves marking a VLAN as assigned to "PseudoNetworking Corporation" in a provisioning data store. For example, with reference to FIG. 3, the name "PseudoNetworking Corporation" may be stored in the field Customer Name 356 of the VLAN provisioning data object 340 for the object related to VLAN ID 722 and Logical site Dallas1. After the VLAN 722 is successfully reserved, a "Successful Reservation" notification 604 is issued to inform the user of the successful reservation.

Figure 7:
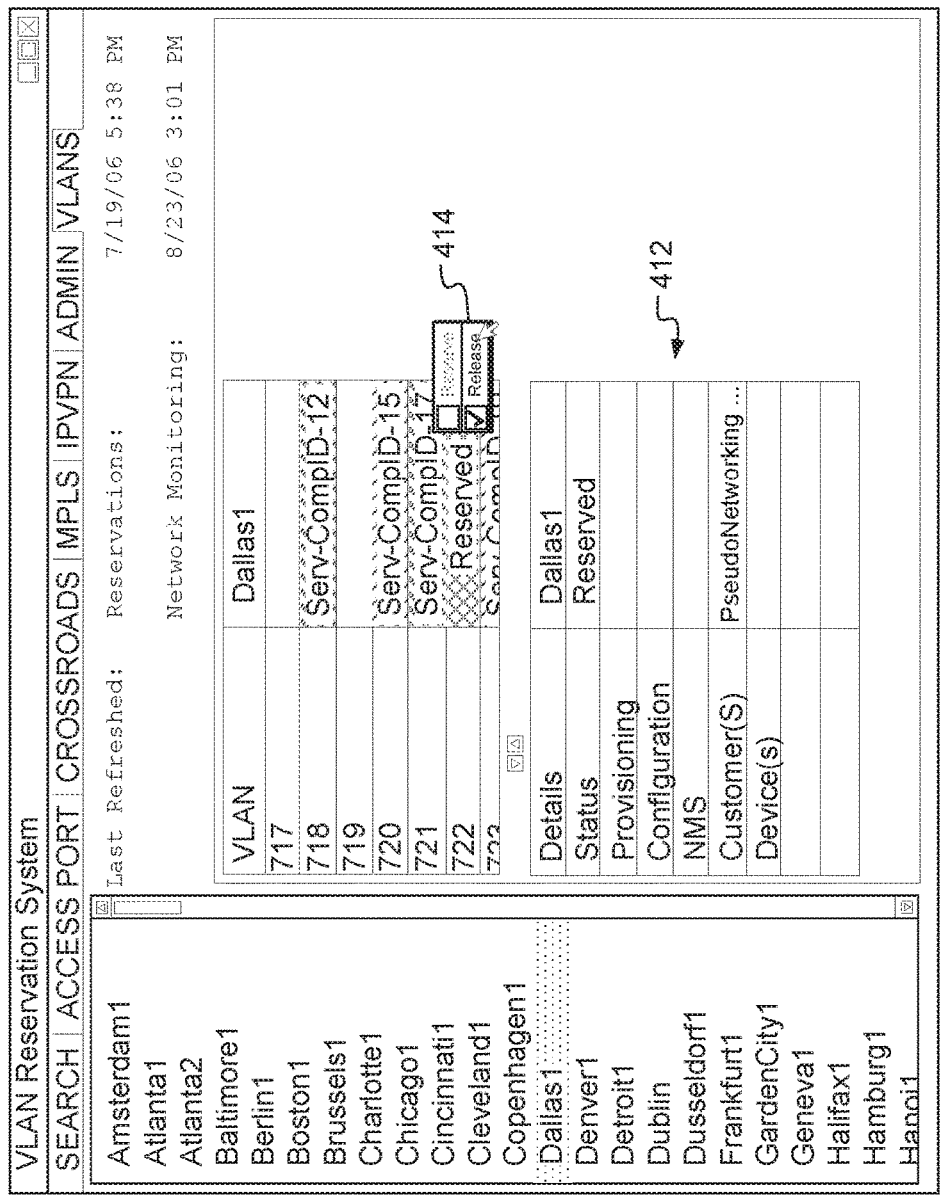

Referring now to GUI 700 in FIG. 7, after the VLAN 722 is successfully reserved, the status of VLAN 722 is updated to "Reserved". The "Reserved" status may be indicated by another color, such as orange, which is shown in double cross-hatching in association with VLAN ID 722. If the user wants to release the VLAN 722 from reservation, the user can select the VLAN 722 (e.g., by right-clicking over the status indicator) and selecting "Release" in the pop-up reservation/release tool 414. In the details table 412, the customer name is also updated to the name selected by the user.

Figure 8:
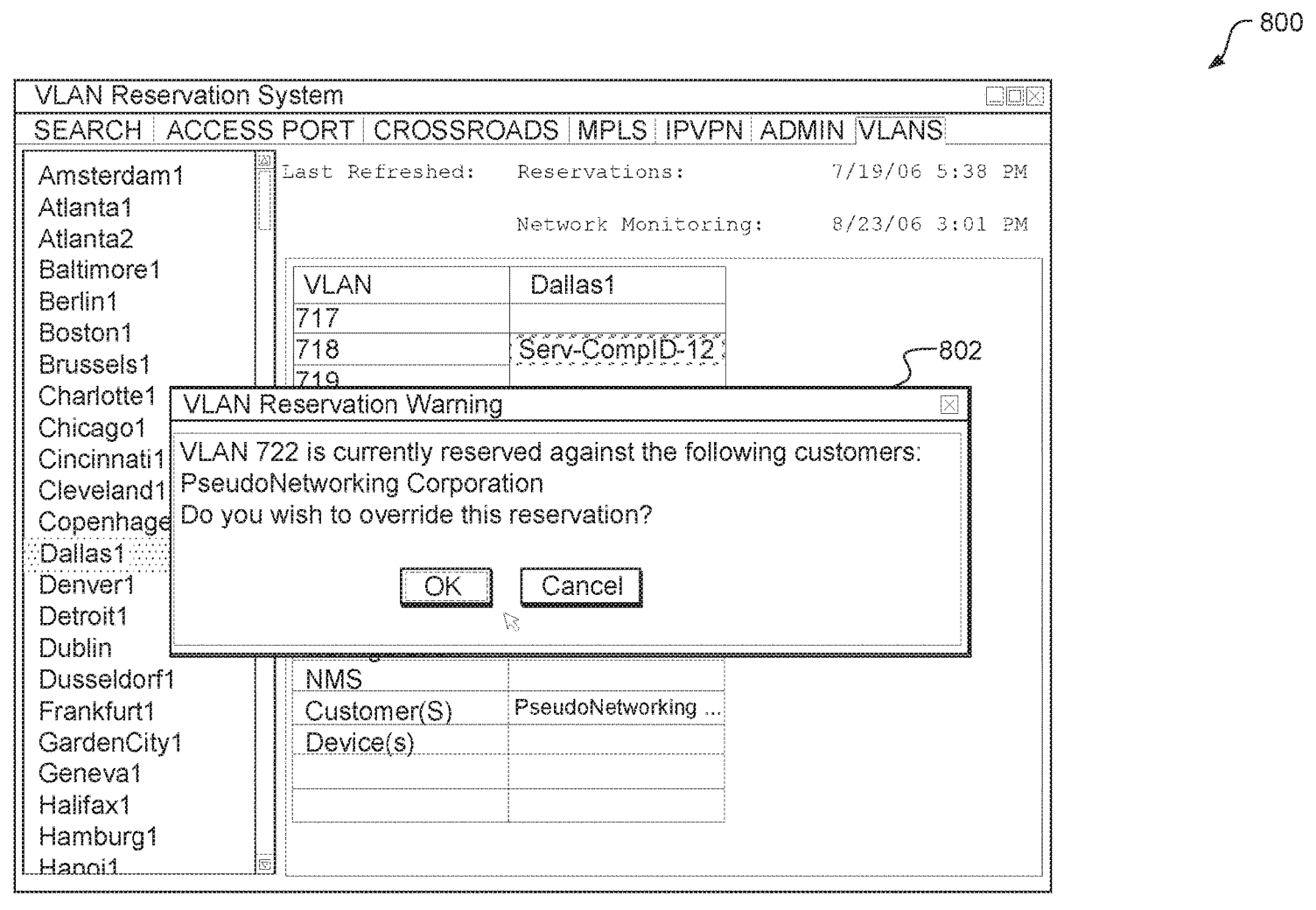

Continuing with the illustrative example, in FIG. 8 a "Currently Reserved" notification 802 is issued to notify the user that the VLAN 722 is already reserved. The "Currently Reserved" notification 802 prompts the user to either override the current reservation and release VLAN 722 or cancel the attempted release of the currently reserved VLAN.

FIG. 9 illustrates a GUI in which statuses of multiple sets of VLANs at multiple logical network sites are presented. The user can select multiple logical sites from the list 402. In the illustrated example, the user has selected Dallas1, London1, Los Angeles1 and New York1 to view status and details of VLANs in those four metropolitan markets. When the user "hovers" the mouse arrow over a selected VLAN, the details table 412 is updated to present details and status associated with the selected VLAN. In this particular scenario, the user is hovering the mouse arrow over VLAN ID 101.

The status of VLAN 101 at logical site Dallas1, London1, Los Angeles1, and New York1 are Error, Clear, Error, and OK, respectively as shown in the details table 412. One reason for the Error at Los Angeles1 may be that the SCID in the VLAN provisioning data store does not match the SCID in the configuration generation data store. Specifically, the SCID for VLAN 101 in the VLAN provisioning data store is SCID 17 while the SCID for VLAN 101 in the Configuration Generation data store is SCID 54. This is in contrast with VLAN 101 at logical site New York1 where the SCIDs of all the data store match with SCID 50.

Exemplary Operations

Figure 10:
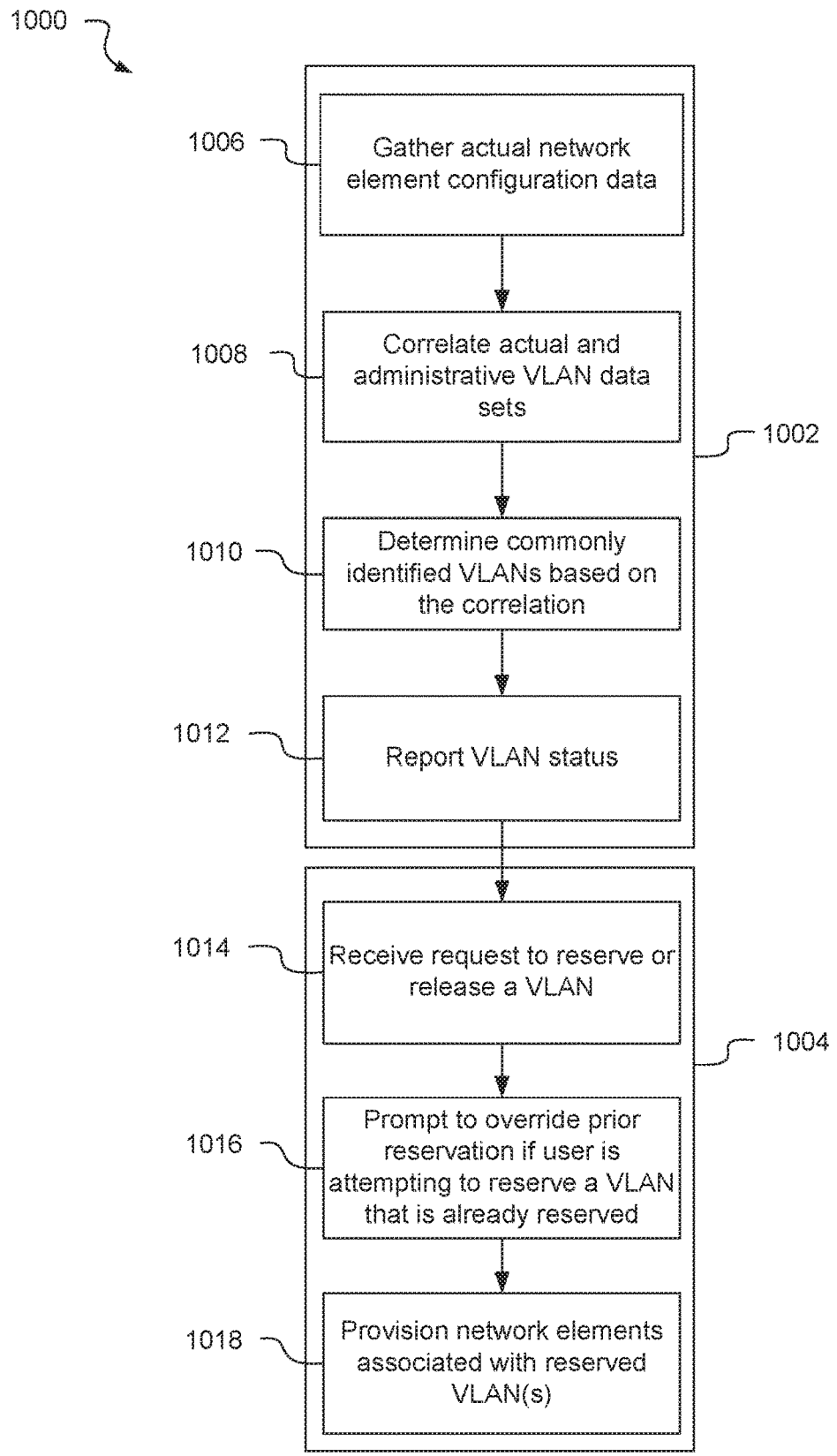
FIGS. 10-11 are flowcharts illustrating algorithms for gathering and reporting VLAN status information, and for reserving and/or releasing VLANs in accordance with one embodiment.

FIG. 10 is a flowchart illustrating a VLAN identifying, reporting and reserving algorithm 1000 in accordance with one embodiment. FIG. 10 is a flowchart illustrating an embodiment of a VLAN reservation and releasing algorithm 1000. The algorithms 1000 and 1100 may be used in conjunction or independently. The order of operations is not limited to that shown in FIGS. 10-11, unless a particular order is necessary. The algorithms 1000 and 1100 can be carried out with a VLAN management system, such as the one shown in FIG. 2 and described above. However, the algorithms 1000 and 1100 can alternatively be carried out on other systems.

Turning to FIG. 10, the algorithm 1000 can be viewed as including two sub-algorithms or processes: an identifying and reporting process 1002 and a reserving, releasing and provisioning algorithm 1004. In the identifying and reporting process 1002, a gathering operation 1006 gathers network element configuration data from network elements operating on the network. In one embodiment, the gathering operation 1006 polls one or more network elements for actual configuration settings, such as a VLAN they are allocated to, IP addresses, network element identifiers, etc. The gathering operation 1002 stores the gathered VLAN data in a data store where it can be retrieved for analysis.

A correlating operation 1008 correlates the actual network element configuration data gather in gathering operation 1006 with one or more sets of administrative VLAN data. Correlating generally involves mapping same data types across two or more data sets for an associated parameter. For example, VLAN identifier data types in the actual network element configuration data may be mapped to VLAN identifier types in an administrative VLAN provisioning data set for a logical site. As another example, service component IDs may be mapped between two data sets for a VLAN in a logical site. As yet another example, VLAN IDs may be mapped two each other for a given network element identified in two data sets.

The correlating operation 1008 may involve neutralizing one or more sets of data to put them into a neutral format so that the data sets are in a common form to enable comparison across different data stores. One embodiment of data neutralization includes generating Java objects based on data objects in SQL, Oracle or other databases.

A determining operation 1010 determines whether the data in the correlated data types is common or not across two or more data sets. Common data is data that is consistent between two or more data sets. For example, if the actual network element configuration data indicates a particular network element is allocated to VLAN 172 in London and the administrative configuration generation data set indicates that VLAN 172 in London includes that particular network element, then the VLAN/logical site pair for that network element is common between the two data sets. Data that is not commonly identified between two data sets is data that is inconsistent between the two data sets. For example, if an administrative provisioning data set indicates that VLAN 556 in Miami is assigned to a company named First Pseudoname Networks.com but an orders administrative data set indicates that VLAN 556 in Miami is assigned to a company named Second Pseudoname Networks.com, then the assigned entity is not commonly identified (i.e., is inconsistent) between the two data sets for VLAN 556 in Miami. Accordingly, by way of example, the determining operation 1010 may involve comparing a VLAN identifier actually allocated to a given network element with a VLAN identifier (if any) associated with the given network element in the provisioning data set or configuration generation data set. The determining operation 1010 may also compare service component IDs between two or more sets of VLAN administrative data to determine whether a given VLAN (at a specified logical site) has been associated with different service components in different VLAN administrative data sets.

A reporting operation 1012 reports the VLAN status. In one embodiment the reporting operation presents one or more tables on a computer monitor, displaying status information for VLANs of one or more logical sites. VLAN status can indicate whether VLANs were commonly identified across two or more sets of VLAN data (e.g., actual configuration data or administratively VLAN data) and/or whether VLANs were inconsistently identified in the different sets of VLAN data. For example, when the VLANs are commonly identified across all the data sets, the status is indicated as "OK" or "VALID"; whereas, if the VLANs are not commonly shown in the data sets then the status indicated would be "INVALID" or "ERROR". VLANs that are shown as being reserved (e.g., in the VLAN provisioning data store) may be marked as "RESERVED". The reporting operation 1012 may also color code the VLAN status indicators (e.g., red for ERROR, green for OK, or yellow for RESERVED).

In the reserving process 1004, a receiving operation 1014 receives a request to reserve or release a VLAN. The receiving operation 1014 may involve the user selecting (e.g., clicking on) a VLAN/Logical site pair. In one embodiment, the user can select multiple VLANs using an input device; e.g., while holding down the control (Ctrl) button on the keyboard, clicking with the mouse on multiple VLAN IDs. The receiving operation 1014 receives a VID and a logical site identifier that was selected by the user. In a prompting operation 1016, if the same VLAN/Logical site was previously reserved, the user is prompted to override the previous reservation. Of course, if there was no previous reservation (i.e., the selected VLAN/Logical Site is available), the prompting operation 1016 will not occur. In a provisioning operation 1018, network elements allocated to the selected VLAN at the logical site are provisioned. The provisioning operation 1018 may happen at some arbitrary or specified time after the VLAN is reserved. As part of the provisioning operation, the allocated network elements are configured to carry communications traffic associated with the reserved VLAN. Provisioning may occur automatically, manually, remotely or locally, or any combination thereof.

Figure 11:
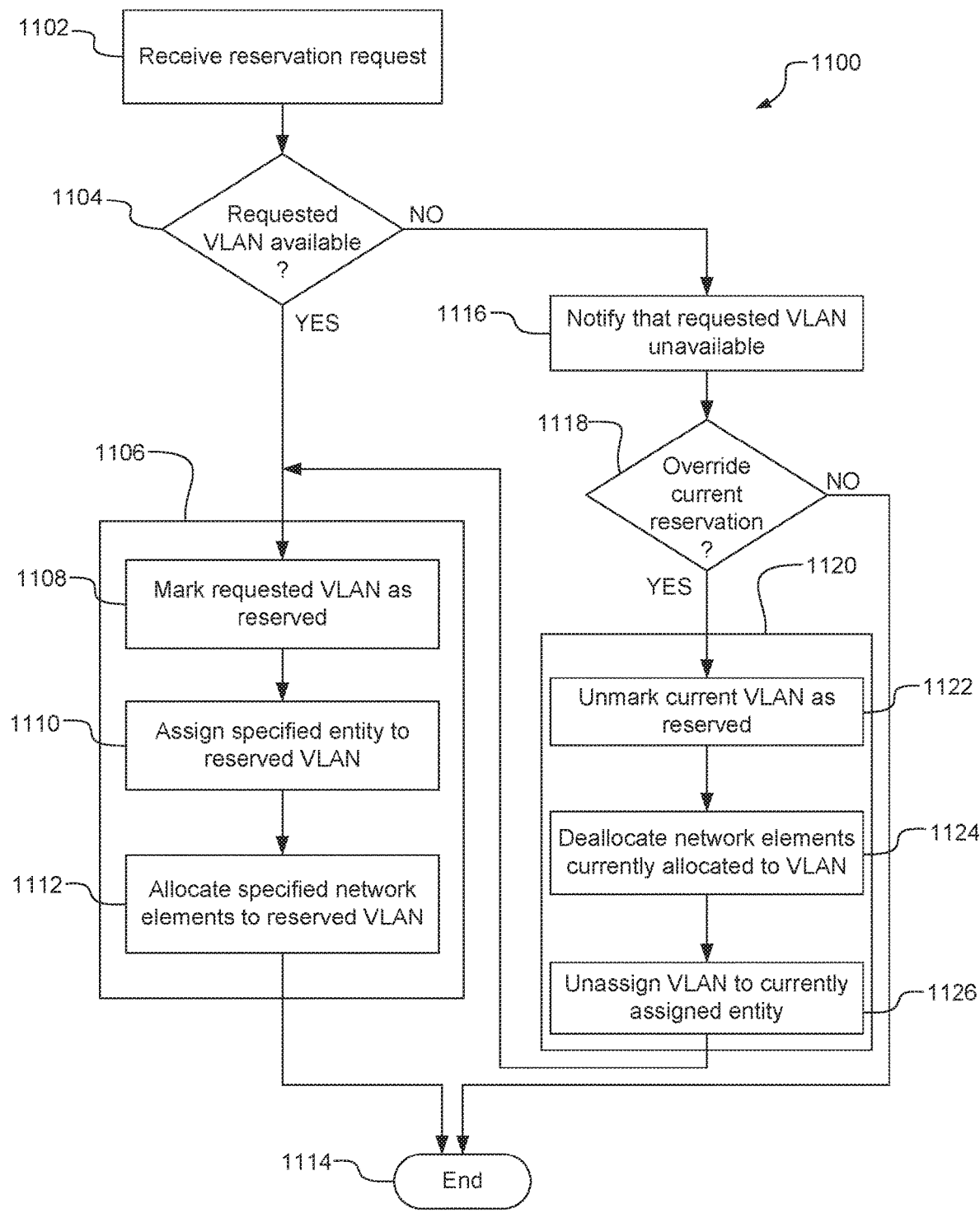

Turning to FIG. 11, the reserving and releasing algorithm 1100 generally reserves or releases VLANs in response to user input. In a receiving operation 1102, a reservation request is received to reserve a specified VLAN at a specified logical site (e.g., a metropolitan market). A querying operation 1104 determines whether the specified VLAN is available at the specified logical site. In some embodiments the querying operation 1104 involves querying a data store, such as an SQL or Oracle database, to determine if the specified VLAN has been reserved. If the specified VLAN is available, the algorithm 1100 branches "YES" to a reserving operation 1106.

The reserving operation 1106 includes a marking operation 1108, an assigning operation 1110 and an allocating operation 1112. In the marking operation 1108, the specified VLAN at the specified logical site is marked as reserved. The marking operation 1108 involves storing a "reserved" indicator (e.g., a flag, bit setting) in association with the specified VLAN ID in a provisioning data store. The assigning operation 1110 assigns the specified VLAN to a specified entity (e.g., a business organization). The assigning operation 1110 may involve prompting the user for, and receiving from the user, an entity identifier, such as a company name. The assigning operation 1110 stores the entity identifier in association with the reserved VLAN ID in the provisioning data store.

The allocating operation 1112 allocates specified network elements to the reserved VLAN. The allocating operation 1112 may prompt the user to indicate which network elements are to be allocated. The allocating operation 1112 may then store network element identifiers in association with the specified VLAN ID in the provisioning data store. Alternatively or in addition, the allocating operation 1112 may mark network element identifier fields in a network element data store as being allocated to the reserved VLAN. After the network elements are allocated, the algorithm 1100 ends at end operation 1114.

Returning to the querying operation 1104, if it is determined that the requested VLAN is not available (i.e., has been previously reserved), the algorithm 1100 branches "NO" to a notifying operation 1116. The notifying operation 1116 notifies the requesting user that the specified VLAN is unavailable and prompts the user to either override the current reservation or not. Another querying operation 1118 determines whether the current VLAN reservation should be overridden. The querying operation 1118 received input from the user indicating whether to override the previous reservation. If the input indicates that the reservation should not be overridden, the algorithm 1100 branches "NO" to the end operation 1114.

If, on the other hand, the previous reservation is to be overridden, the algorithm 1100 branches "YES" to a releasing operation 1120. The releasing operation 1120 includes an unmarking operation 1122, deallocating operation 1124 and unassigning operation 1126. The unmarking operation 1122 unmarks the previously marked VLAN ID; i.e., the unmarking operation 1122 removes the reservation indicator associated with the VLAN ID in the provisioning data store. The deallocating operation 1124 deallocates any network elements that were previously allocated to the specified VLAN. Deallocating operation 1124 essentially performs the opposite process as that of the allocating operation 1112; e.g., the deallocating operation 1124 may unmark network element IDs as reserved in the provisioning data store. The unassigning operation 1126 reverses the assigning operation 1110, whereby the entity identifier is no longer associated with the specified VLAN ID.

Exemplary Computing Device

Figure 12:
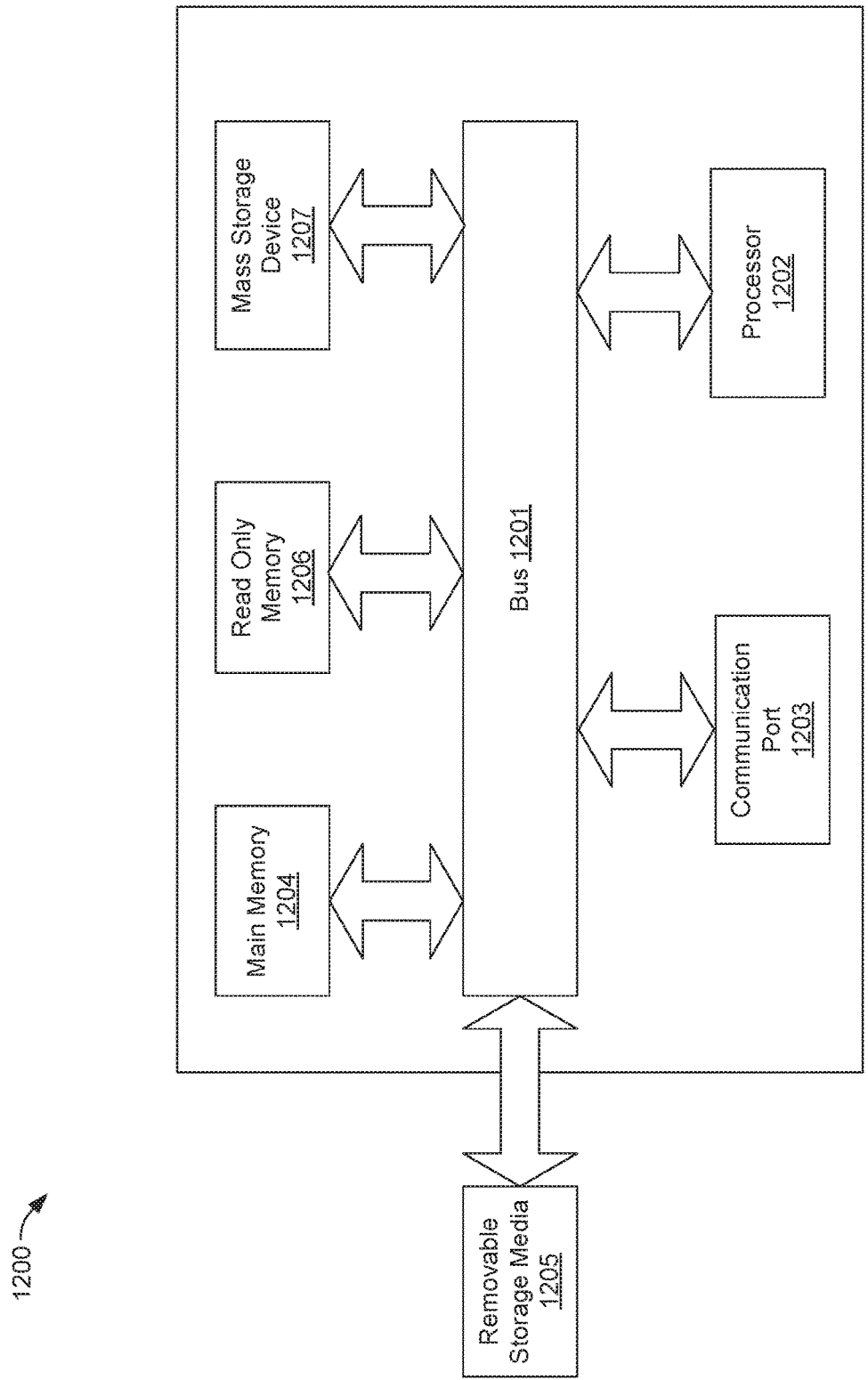
FIG. 12 illustrates a general purpose computing device upon which one or more aspects of embodiments of a VLAN management system may be implemented.

FIG. 12 is a schematic diagram of a computing device 1200 upon which embodiments of the VLAN management system and/or other modules and processes may be implemented and carried out. As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware.

According to the present example, the computing device 1200 includes a bus 1201, at least one processor 1202, at least one communication port 1203, a main memory 1204, a removable storage media 1205, a read only memory 1206, and a mass storage 1207. Processor(s) 1202 can be any know processor, such as, but not limited to, an Intel® Itanium® or Itanium 2® processor(s), AMD® Opteron® or Athlon MP® processor(s), or Motorola® lines of processors. Communication port(s) 1203 can be any of an RS-232 port for use with a modem based dialup connection, a 10/100 Ethernet port, a Gigabit port using copper or fiber, or a USB port. Communication port(s) 1203 may be chosen depending on a network such a Local Area Network (LAN), Wide Area Network (WAN), or any network to which the computing device 1200 connects. The computing device 1200 may be in communication with peripheral devices (not shown) such as, but not limited to, printers, speakers, cameras, microphones, or scanners.

Main memory 1204 can be Random Access Memory (RAM), or any other dynamic storage device(s) commonly known in the art. Read only memory 1206 can be any static storage device(s) such as Programmable Read Only Memory (PROM) chips for storing static information such as instructions for processor 1202. Mass storage 1207 can be used to store information and instructions. For example, hard disks such as the Adaptec® family of SCSI drives, an optical disc, an array of disks such as RAID, such as the Adaptec family of RAID drives, or any other mass storage devices may be used.

Bus 1201 communicatively couples processor(s) 1202 with the other memory, storage and communication blocks. Bus 1201 can be a PCI/PCI-X, SCSI, or USB based system bus (or other) depending on the storage devices used. Removable storage media 1205 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

In the foregoing description, numerous specific details are set forth in order to provide a thorough understanding of embodiments of the present invention. It will be apparent, however, to one skilled in the art that embodiments of the present invention may be practiced without some of these specific details. Embodiments of the present invention include various steps, which are described in this specification. The steps may be performed by hardware components or may be embodied in machine-executable (e.g., computer-executable) instructions, which may be used to cause a general-purpose or special-purpose processor programmed with the instructions to perform the steps. Alternatively, the steps may be performed by a combination of hardware, software and/or firmware.

Embodiments of the present invention may be provided as a computer program product, which may include a machine-readable or computer-readable medium having instructions stored thereon, which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

What is claimed is:

1. A method for managing a virtual local area network (VLAN), the method comprising:

receiving, by a VLAN management system, a reservation request from a user to reserve the VLAN for a first entity;

determining, by the VLAN management system, whether the VLAN is available, in response to the reservation request;

notifying, by the VLAN management system, to the user that the VLAN is unavailable, in response to determining that the VLAN is reserved to a second entity;

receiving, by the VLAN management system, an instruction from the user to override the reservation of the VLAN to the second entity;

releasing, by the VLAN management system, the reservation of the VLAN to the second entity, in response to the instruction to override the reservation of the VLAN to the second entity wherein releasing the reservation of the VLAN to the second entity includes deallocating, by the VLAN management system, network elements already allocated to the VLAN, and unassigning, by the VLAN management system, the VLAN from the second entity; and reserving, by the VLAN management system, the VLAN to the first entity, in response to releasing the reservation of the VLAN to the second entity.

2. The method of claim 1, wherein reserving the VLAN to the first entity includes:
adding, by the VLAN management system, an association between an identification of the first entity and the identification of the VLAN; and
allocating, by the VLAN management system, network elements to the VLAN.

3. The method of claim 2, wherein allocating the network elements to the VLAN includes:
prompting, by the VLAN management system, the user to identify which network elements to be allocated to the VLAN; and
allocating, by the VLAN management system, the identified network elements to the VLAN.

4. The method of claim 1, wherein receiving the reservation request includes:
presenting, by the VLAN management system, a user interface displaying a list of VLANs, and
receiving, by the VLAN management system, a selection of the VLAN from the list of VLANs.

5. The method of claim 4, wherein presenting the user interface displaying the list of VLANs includes:
determining, by the VLAN management system, VLANs that are consistently identified in different data sets; and
indicating, by the VLAN management system, the determined VLANs as valid.

6. The method of claim 4, wherein presenting the user interface displaying the list of VLANs includes:
determining, by the VLAN management system, VLANs that are inconsistently identified in different data sets; and
indicating, by the VLAN management system, that the determined VLANs as error.

7. The method of claim 4, wherein presenting the user interface displaying the list of VLANs includes:
determining, by the VLAN management system, VLANs that are reserved; and
indicating, by the VLAN management system, that the determined VLANs as reserved.

8. A system for managing a virtual local area network (VLAN), the system comprising:
one or more processors; and
a non-transitory computer readable medium storing instructions when executed by the one or more processors cause the one or more processors to:
receive a reservation request from a user to reserve the VLAN for a first entity;
determine whether the VLAN is available, in response to the reservation request;
notify to the user that the VLAN is unavailable, in response to determining that the VLAN is reserved to a second entity;
receive an instruction from the user to override the reservation of the VLAN to the second entity;
release the reservation of the VLAN to the second entity, in response to the instruction to override the reservation of the VLAN to the second entity, wherein releasing the reservation of the VLAN to the second entity includes deallocating network elements already allocated to the VLAN, and unassigning the VLAN from the second entity; and
reserve the VLAN to the first entity, in response to releasing the reservation of the VLAN to the second entity.

9. The system of claim 8, wherein the instructions that cause the one or more processors to reserve the VLAN to the first entity further include instructions when executed by the one or more processors cause the one or more processors to:
add an association between an identification of the first entity and the identification of the VLAN; and
allocate network elements to the VLAN.

10. The system of claim 9, wherein the instructions that cause the one or more processors to allocate the network elements to the VLAN further include instructions when executed by the one or more processors cause the one or more processors to:
prompt the user to identify which network elements to be allocated to the VLAN; and
allocate the identified network elements to the VLAN.

11. The system of claim 8, wherein the instructions that cause the one or more processors to receive the reservation request further include instructions when executed by the one or more processors cause the one or more processors to:
present a user interface displaying a list of VLANs, and
receive a selection of the VLAN from the list of VLANs.

12. The system of claim 11, wherein the instructions that cause the one or more processors to present the user interface displaying the list of VLANs further include instructions when executed by the one or more processors cause the one or more processors to:
determine VLANs that are consistently identified in different data sets; and
indicate the determined VLANs as valid.

13. The system of claim 11, wherein the instructions that cause the one or more processors to present the user interface displaying the list of VLANs further include instructions when executed by the one or more processors cause the one or more processors to:
determine VLANs that are inconsistently identified in different data sets; and
indicate that the determined VLANs as error.

14. The system of claim 11, wherein the instructions that cause the one or more processors to present the user interface displaying the list of VLANs further include instructions when executed by the one or more processors cause the one or more processors to:
determine VLANs that are reserved; and
indicate that the determined VLANs as reserved.

15. A non-transitory computer readable medium for managing a virtual local area network (VLAN), the non-transitory computer readable medium storing instructions when executed by one or more processors cause the one or more processors to:
receive a reservation request from a user to reserve the VLAN for a first entity;
determine whether the VLAN is available, in response to the reservation request;
notify to the user that the VLAN is unavailable, in response to determining that the VLAN is reserved to a second entity;
receive an instruction from the user to override the reservation of the VLAN to the second entity;
release the reservation of the VLAN to the second entity, in response to the instruction to override the reservation of the VLAN to the second entity, wherein releasing the reservation of the VLAN to the second entity includes deallocating network elements already allocated to the VLAN, and unassigning the VLAN from the second entity; and reserve the VLAN to the first entity, in response to releasing the reservation of the VLAN to the second entity.

16. The non-transitory computer readable medium of claim 15, wherein the instructions that cause the one or more processors to reserve the VLAN to the first entity further include instructions when executed by the one or more processors cause the one or more processors to:
  add an association between an identification of the first entity and the identification of the VLAN; and
  allocate network elements to the VLAN.

17. The non-transitory computer readable medium of claim 16, wherein the instructions that cause the one or more processors to allocate the network elements to the VLAN further include instructions when executed by the one or more processors cause the one or more processors to:
  prompt the user to identify which network elements to be allocated to the VLAN; and
  allocate the identified network elements to the VLAN.

* * * * *